UNITED STATES PATENT OFFICE.

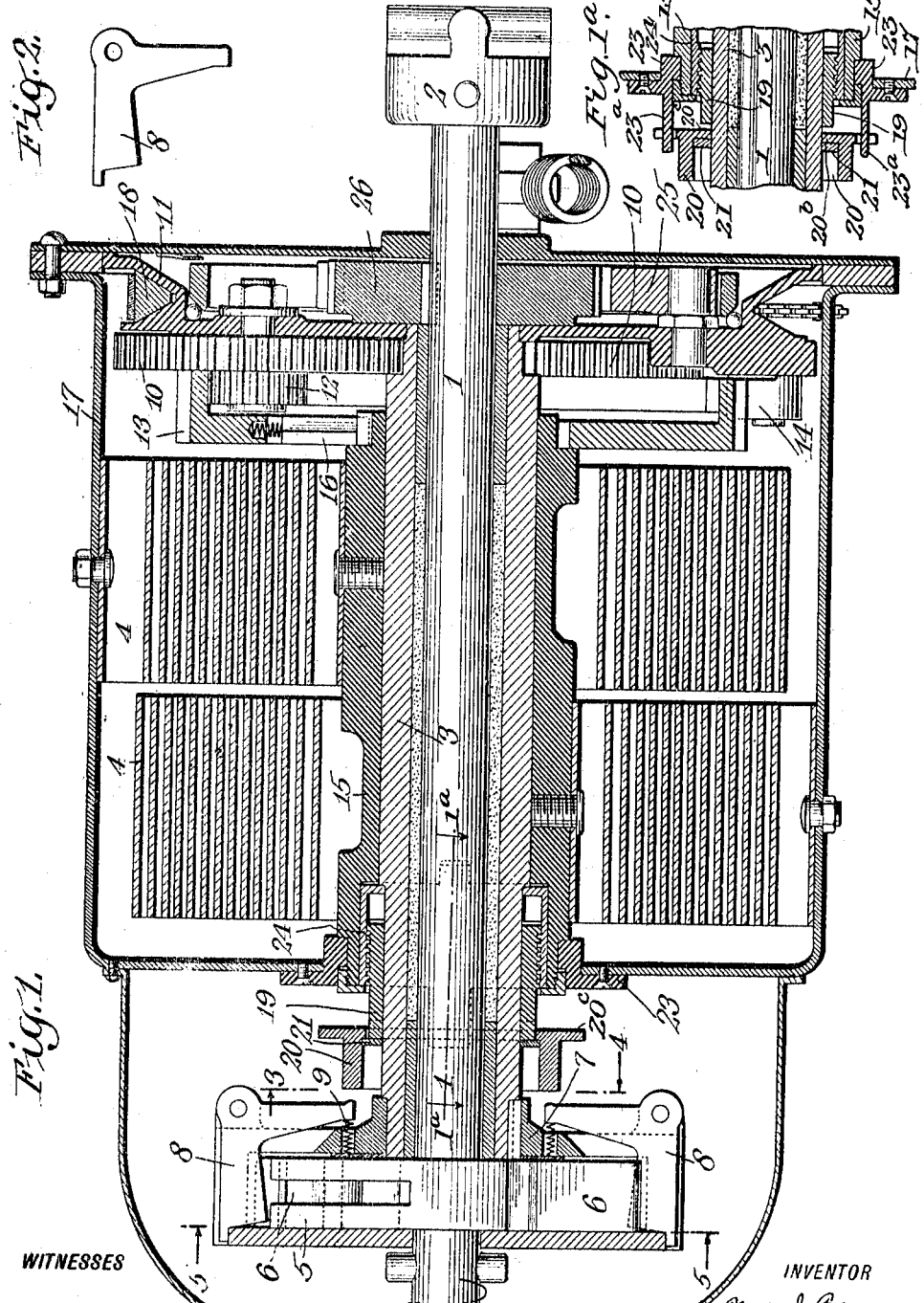

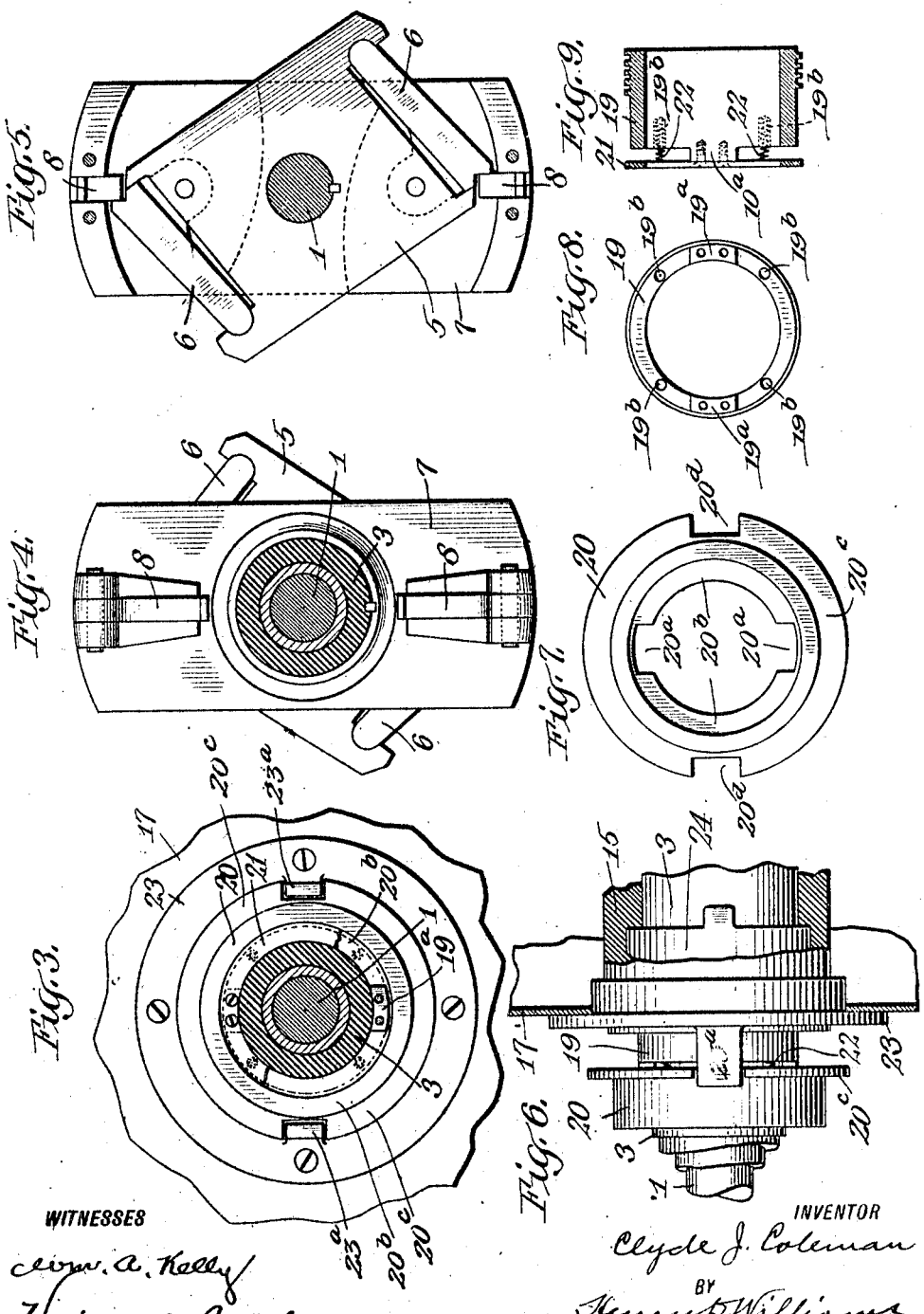

CLYDE J. COLEMAN, OF NEW ROCHELLE, NEW YORK, ASSIGNOR TO CONRAD HUBERT, OF NEW YORK, N. Y.

ENGINE-STARTER.

1,102,322. Specification of Letters Patent. Patented July 7, 1914.

Original application filed March 29, 1907, Serial No. 365,396. Renewed July 27, 1912, Serial No. 711,918. Divided and this application filed March 21, 1913. Serial No. 755,879.

*To all whom it may concern:*

Be it known that I, CLYDE J. COLEMAN, a citizen of the United States, residing at New Rochelle, in the county of Westchester and State of New York, have invented a certain new and useful Improvement in Engine-Starters, of which the following is a specification, reference being had therein to the accompanying drawings, forming part thereof.

The present application is divisional of my application for patent for engine starter, which became Letters Patent No. 1,056,972, of March 25, 1913.

The invention relates to engine starters for starting internal combustion engines, particularly those of automobiles, and the present improvements relate to the mechanism for effecting the re-storing of the energy-storing device with energy and more particularly relate to the rewinding mechanism by which a starter spring is automatically rewound by the engine.

The objects of my present invention are simplicity of construction, durability, reliability in operation and other advantages which will hereinafter appear.

In carrying out my present invention, I employ two-armed pivoted winding dogs, preferably of substantially bell-crank shape or L-shape, for rotatively connecting an engine-connected part with an energy-storing device, one of the arms of a dog being an engaging arm and the other arm being a dog-actuating arm or releasing arm. These dogs are arranged to have a bias or tendency to their engaging positions and are adapted to be released by a releasing device connected with the energy-storing device, and such releasing device is shown as movable longitudinally to engage the inwardly-extending dog-actuating arms of the dogs. Also means are provided for imparting to the disengaged dogs a final clearance-providing movement, such means being shown as springs arranged to act in opposition to the dog-engaging springs after the dogs have been disengaged from the engine-connected part, and these clearance-providing springs are shown as combined with the releasing device.

I shall now describe the engine starter embodying my invention illustrated in the accompanying drawings and shall thereafter point out my invention in claims.

Figure 1 is a longitudinal central vertical section of the engine starter. Fig. 1ª is a partial central horizontal section on a plane indicated by the line 1ª—1ª of Fig. 1. Fig. 2 is a side elevation of one of the winding dogs. Fig. 3 is a transverse vertical section on a plane indicated by the line 3—4 of Fig. 1 as viewed from the left, showing the dog-releasing device in front elevation. Fig. 4 is the same section as viewed in the opposite direction and shows the dog carrier and winding block in rear elevation. Fig. 5 is a similar section on a plane indicated by the line 5—5 of Fig. 1 as viewed from the left and shows the winding block and the dog carrier in front elevation. Fig. 6 is a side elevation, with other parts broken away, of the dog-releasing device as viewed from the right in Fig. 3. Fig. 7 is a front elevation of the dog-releasing annulus of the dog-releasing device. Fig. 8 is a front elevation, rotated through a quarter rotation as compared with the preceding figures, of the actuating sleeve of the dog-releasing device. Fig. 9 is a vertical section of what appears in Fig. 8 with the addition of clearance-providing springs and ring.

A starter shaft 1 is adapted to be permanently connected to the engine shaft by means of a coupling member 2 adapted to engage a coöperating coupling member on the engine shaft. A spring-winding sleeve 3 surrounds the starter shaft 1 and in which the starter shaft rotates freely when the starter springs 4 are in wound condition. My present invention relates to rewinding mechanism for automatically rotatively connecting together the starter shaft 1 and the spring-winding sleeve 3 to effect the rewinding of the starter springs 4 after an engine-starting operation, and for automatically disconnecting these parts when the starter springs have been wound.

A winding block 5 is keyed on the starter shaft 1 and is provided at its ends with ratchet teeth 6, sloping on one side and having abrupt engaging faces at the other side, as shown. A head or dog carrier 7 is keyed on the adjacent end of the spring-winding sleeve 3 and has peripheral flanges just outward from the path of the teeth 6 of the winding block 5 and is provided with outwardly-directed or radial slots which extend through these flanges. Angular two-armed winding dogs 8 of L-shape or bell-crank shape, shown as two in number corresponding to the number of ratchet teeth 6, fit closely but movably in the radial slots of the dog carrier 7 and are medially pivoted thereto so as to have a dog-actuating arm extending inward toward the spring-winding sleeve 3 and an engaging arm extending longitudinally at the outside of the winding block 5 normally in position to be engaged by the ratchet teeth 6 of the engine-connected winding block 5.

The winding dogs 8 are pressed toward their positions of engagement with the teeth 6 by coiled thrust springs 9 contained in sockets in the dog carrier 7 and pressing against the front faces of the actuating arms of the dogs. These dog-engaging springs 9, when unrestrained, will hold the outer arms of the winding dogs 8 inward in the paths of the teeth 6 of the winding block 5, so that the starter shaft 1 is then rotatively connected to the spring-winding sleeve 3 to wind the starter springs 4, and this is the position of the parts shown in the drawings.

As means for transmitting the winding movement of the winding sleeve 3 to the starter springs 4, the winding sleeve 3 has gear teeth which mesh with planetary gears 10 mounted on a spring-locking disk 11 and carrying pinions 12 which mesh with internal gear teeth on a ratchet disk 13. External ratchet teeth on this disk 13 are engaged by spring-retaining pawls 14 pivoted on the locking disk 11, for holding the starter springs 4 in wound condition. The ratchet disk 13 communicates the winding movement to a spring-carrying sleeve 15 through the intermediary of spring-pressed relief pawls 16 carried by the ratchet disk 13 and coöperative with ratchet teeth formed on the spring-carrying sleeve 15. The function of the latter ratchet connection is to prevent the momentum of the parts from carrying the starter springs beyond their unwound condition at the conclusion of the engine-starting operation. The inner ends of the spiral starter springs 4 are anchored to the spring-winding sleeve 15 and their outer ends are anchored to a stationary casing 17. In the starter illustrated in the drawings, the starter shaft 1, as viewed from the front, rotates in a clockwise direction, as indicated by the arrow in Fig. 1. During the winding of the starter springs 4, the spring-winding sleeve 3 partakes of the movement of the starter shaft 1, while the spring-carrying sleeve 15 will be rotated in a reverse or counter-clockwise direction through the above described reducing gearing, the locking disk 11 being held stationary by means of a peripheral brake band 18.

The means for automatically discontinuing the winding operation after the starter springs 4 have been wound will now be described.

An externally screw-threaded longitudinally movable non-rotative dog-actuating collar 19 is loosely mounted on the spring-winding sleeve 3. The screw-threaded collar 19 at its forward end is connected for non-rotative longitudinal lost motion movement with a flanged dog-releasing annulus 20 by means of longitudinal projections 19$^a$ on the collar 19 engaging internal notches 20$^a$ in an internal flange 20$^b$ of the releasing annulus 20, the forward end of the collar 19 being arranged to abut against the internal flange 20$^b$ of the annulus 20, as most clearly appears in Fig. 1$^a$; and an annulus-retracting ring 21 is shown as secured by screws to the ends of the projections 19$^a$ of the collar 19 and adapted to engage the front side of the inwardly-extending flange 20$^b$ on the annulus 20, as clearly appears in the drawings. The longitudinal lost motion between the dog-releasing annulus 20 and the screw-threaded collar 19 is adapted to be taken up by clearance-providing coiled thrust springs 22, shown as seated in longitudinal sockets or bores 19$^b$ in the front of the collar 19 and pressing against the rear face of the inwardly-extending flange 20$^b$ of the dog-releasing annulus 20. An outwardly-extending flange 20$^c$ on the annulus 20 has peripheral notches 20$^d$ which slidably receive longitudinally-projecting rotation-preventing prongs 23$^a$ carried by a stationary supporting bearing or journal box 23 for the adjacent end of the spring-carrying sleeve 15, so that the dog-releasing annulus 20, and consequently also the screw-threaded collar 19, are prevented from rotating, but are permitted to slide longitudinally, the bearing 23 having a flange bolted to the starter casing 17, as shown.

A nut 24 is fixed in the spring-carrying sleeve 15 and engages the screw threads of the collar 19 to impart longitudinal traveling movement to the screw-threaded collar upon the rotation of the nut 24 by the spring-carrying sleeve. The direction of the interengaging screw-threads is such that the counter-clockwise winding movement of the spring-carrying sleeve will cause the collar 19 to travel outward, carrying with it the dog-releasing annulus 20 under the pressure of the clearance-providing springs 22 against the internal flange 20$^b$ of the annulus. The annulus 20 travels first idly across an intervening space, and then, near the end of the winding operation, into contact with the inwardly-extending dog-releasing arms of the spring-winding dogs 8. As the collar 19 continues to travel outward the winding dogs 8 will not be at first moved, being retained in engagement with the teeth 6 of the winding block 5 by friction, but the continued movement of the collar 19 will compress the clearance-providing springs 22 until the traveling collar 19 has covered the free space or lost motion provided between the forward end of the collar 19 and the internal flange 20ᵇ of the annulus 20 at the rear of the latter (see Fig. 6). After the springs 22 have been compressed and this lost motion is taken up the forward end of the collar 19 will come into contact with the internal flange 20ᵇ of the annulus 20 at the rear thereof and will positively move the annulus 20 and the annulus 20 will impart positive pivotal movement to the winding dogs 8 and will disengage their outer arms from the teeth 6 of the winding block 5. Thereupon the winding of the starter springs 4 will be discontinued, the starter shaft 1 and winding block 5 continuing to rotate with the engine, while rotation of the spring-winding sleeve 3 and its adjuncts, including the head or dog carrier 7 and winding dogs 8, will cease.

It is desirable to have a substantial clearance space between the now stationary disengaged winding dogs 8 and the teeth 6 of the rotating winding block 5, to obviate any rubbing and wear of these parts. Upon the disengagement of the winding dogs 8 from the teeth 6, the clearance-providing springs 22 will take up the lost motion between the collar 19 and the annulus 20, thereby imparting a further forward movement to the annulus 20, this further movement being communicated by the annulus 20 to the winding dogs 8 to move them to positions of complete clearance in relation to the teeth 6 of the winding block 5.

When the starter springs 4 are permitted to unwind in starting the engine, the spring-carrying outer sleeve 15 will be rotated by these springs in a clockwise direction, as viewed from the front, carrying with it the nut 24, which will retract or draw inward the dog-actuating collar 19. The collar 19 will correspondingly move the annulus 20 rearwardly through the engagement of the annulus-retracting ring 21 with the internal flange of the annulus. The first part of the rearward movement of the annulus 20 will remove restraint from the dog-engaging springs 9 and permit them to return the winding dogs 8 to their engaging or spring-winding positions in the path of and ready for engagement by the ratchet teeth 6 of the winding block 5. During the engine-starting operation, the spring-winding sleeve 3 and the starter shaft 1 will be rotated together by reason of the gear and pawl connections at the rear of the starter, and after the completion of the starting operation and before rewinding of the starter springs 4 begins the spring-winding sleeve 3 will be turned idly by the winding dogs 8.

To bring the starter springs 4 into action for starting the engine, the brake band 18, which is normally spring-pressed to engaging position, is released, as by pressing a pedal. With the brake band 18 released, the spring-locking disk 11 may rotate through the impulse of the locked spring-retaining pawls 14, the ratchet disk 13 and the locking disk 11 rotating as a unit and carrying with them, in an idle condition, the intermediate planetary gears 10 and 12 and the winding sleeve 3. The locking disk 11 imparts its rotation to the starter shaft 1 through starting pawls 25 pivoted on the locking disk 11 and engageable with the teeth of a ratchet wheel 26 keyed on the starter shaft 1.

The rewinding of the starter springs 4 will not begin until the brake band 18 has been permitted to lock the spring-locking disk 11, but this locking disk will be idly rotated through the gearing. However, as soon as the locking disk 11 is locked, winding of the starter springs 4 will take place through the reducing gearing, as hereinbefore explained, the winding dogs 8 having been automatically released ready for engagement. As soon as the rewinding begins, the screw-threaded dog-actuating collar 19 begins its outward travel, resulting in the disengagement of the winding dogs 8 at the completion of the winding operation, as has been hereinbefore explained.

It is obvious that various modifications may be made in the construction shown in the drawings and above particularly described within the principle and scope of my invention.

I claim:—

1. An engine starter having, in combination, an energy-storing device, means for connecting said device with an engine to start the engine, means for connecting the engine with said device to re-store the device with energy comprising a part rotatively connected with the engine, a rotary dog-carrier connected with the energy-storing device, a dog pivoted on the dog carrier having an engaging arm adapted to be engaged by the engine-connected part to re-store the device with energy and also having a releasing arm, and a releasing device connected with the energy-storing device and acting to move the releasing arm of the dog to disengage the engaging arm of the dog from the engine-connected part upon the completion of the energy-storing operation.

2. An engine starter having, in combination, an energy-storing device, means for connecting said device with an engine to start the engine, means for connecting the engine with said device to re-store the device with energy comprising a part rotatively connected with the engine, a rotary dog carrier connected with the energy-storing device, an angular dog pivoted on the dog carrier having an engaging arm adapted to be engaged by the engine-connected part to re-store the device with energy and having a releasing arm projecting at an angle to the engaging arm, and a releasing device connected with the energy-storing device and acting to move the releasing arm of the dog to disengage the engaging arm of the dog from the engine-connected part upon the completion of the energy-storing operation.

3. An engine starter having, in combination, an energy-storing device, means for connecting said device with an engine to start the engine, means for connecting the engine with said device to re-store the device with energy comprising a part rotatively connected with the engine, a rotary dog carrier connected with the energy-storing device, an L-shaped dog pivoted on the dog carrier and having a bias to the engaging position, one arm of the dog being adapted to be engaged by the engine-connected part and the other arm being a dog-actuating arm, and a dog-releasing device connected with the energy-storing device and operative to engage and move the actuating arm of the dog to disengage the dog from the engine-connected part upon the completion of the energy-storing operation and to permit the return of the dog to engaging position upon the use of the energy-storing device in an engine-starting operation.

4. An engine starter having, in combination, an energy-storing device, means for connecting said device with an engine to start the engine, means for connecting the engine with said device to re-store the device with energy comprising a part rotatively connected with the engine, a rotary dog carrier connected with the energy-storing device and provided with outwardly-directed slots, L-shaped dogs pivoted on the dog carrier to move in the slots and having each an inwardly-extending dog-actuating arm and a longitudinally-extending engaging arm adapted to be engaged by the outer portion of the engine-connected part, dog-engaging springs acting to move the dogs to the engaging position in relation to the engine-connected part, and a dog-releasing device movable longitudinally and connected with the energy-storing device to be moved longitudinally thereby in one direction to move the actuating arms of the dogs and thereby disengage the dogs from the engine-connected part upon the completion of the energy-storing operation and to be moved longitudinally in the other direction to permit the dog-engaging springs to return the dogs to engaging position upon the use of the energy-storing device in an engine-starting operation.

5. An engine starter having, in combination, an energy-storing device, means for connecting said device with an engine to start the engine, means for connecting the engine with said device to re-store the device with energy comprising a part rotatively connected with the engine, a rotary dog carrier connected with the energy-storing device, a dog on the dog carrier arranged to be engaged by the engine-connected part to re-store the device with energy, a releasing device connected with the energy-storing device and acting to disengage the dog from the engine-connected part upon the completion of the energy-storing operation, and clearance-providing means operative to move the dog to a position of clearance in relation to the engine-connected part after the dog has been disengaged from the engine-connected part.

6. An engine starter having, in combination, an energy-storing device, means for connecting said energy-storing device with an engine to start the engine, means for connecting the engine with said device to restore the device with energy comprising a part rotatively connected with the engine, a rotary dog carrier connected with the energy-storing device, dogs on the dog carrier arranged to be engaged by the engine-connected part to re-store the device with energy, springs connected with the dogs and acting to move them to positions of engagement with the engine-connected part, a releasing device connected with the energy-storing device and acting to disengage the dogs from the engine-connected part upon the completion of the energy-storing operation and to permit the dog-engaging springs to return the dogs to the engaging position upon the use of the energy-storing device in an engine-starting operation, and clearance-providing springs acting in opposition to the dog-engaging springs to impart to the dogs a further clearance-providing movement after the dogs have been disengaged from the engine-connected part.

7. An engine starter having, in combination, an energy-storing device, means for connecting said device with an engine to start the engine, means for connecting the engine with said device to re-store the device with energy comprising a part rotatively connected with the engine, a rotary dog carrier connected with the energy-storing device and provided with outwardly-directed slots, L-shaped dogs pivoted on the dog carrier to move in the slots and having each an inwardly-extending dog-actuating arm and a longitudinally-extending engaging arm adapted to be engaged by the outer portion of the engine-connected part, dog-engaging springs acting to move the dogs to the engaging position in relation to the engine-connected part, a dog-releasing device movable longitudinally and connected with the energy-storing device to be moved longitudinally thereby in one direction to move the actuating arms of the dogs and thereby disengage the dogs from the engine-connected part upon the completion of the energy-storing operation and to be moved longitudinally in the other direction to permit the dog-engaging springs to return the dogs to engaging position upon the use of the energy-storing device in an engine-starting operation, and clearance-providing springs acting in opposition to the dog-engaging springs to impart to the dogs a further clearance-providing movement after the dogs have been disengaged from the engine-connected part.

8. An engine starter having, in combination, an energy-storing device, means for connecting said energy-storing device with an engine to start the engine, means for connecting the engine with said device to re-store the device with energy comprising a part rotatively connected with the engine, a rotary dog carrier connected with the energy-storing device, dogs on the dog carrier arranged to be engaged by the engine-connected part to re-store the device with energy, springs connected with the dogs and acting to move them to positions of engagement with the engine-connected part, a releasing device connected with the energy-storing device and acting to disengage the dogs from the engine-connected part upon the completion of the energy-storing operation and to permit the dog-engaging springs to return the dogs to the engaging position upon the use of the energy-storing device in an engine-starting operation, and clearance-providing springs combined with the releasing device to impart to the dogs a further clearance-providing movement after the dogs have been disengaged from the engine-connected part.

9. An engine starter having, in combination, an energy-storing device, means for connecting said device with an engine to start the engine, means for connecting the engine with said device to re-store the device with energy comprising a part rotatively connected with the engine, a rotary dog carrier connected with the energy-storing device, dogs on the dog carrier arranged to be engaged by the engine-connected part to re-store the device with energy, springs connected with the dogs and acting to move them to positions of engagement with the engine-connected part, a releasing member for disengaging the dogs from the engine-connected part, an actuating part having a lost motion connection with the releasing member and connected with the energy-storing device so as to impart dog-disengaging movement to the actuating member upon the completion of the energy-storing operation, and clearance-providing springs acting after the disengagement of the dogs to take up the lost motion between the releasing member and the actuating part so that the releasing member will impart to the dogs a further clearance-providing movement.

10. An engine starter having, in combination, an energy-storing device, means for connecting said device with an engine to start the engine, means for connecting the engine with said device to re-store the device with energy comprising a part rotatively connected with the engine, a rotary dog carrier connected with the energy-storing device and provided with outwardly-directed slots, L-shaped dogs pivoted on the dog carrier to move in the slots and having each an inwardly-extending dog-actuating arm and a longitudinally-extending engaging arm adapted to be engaged by the outer portion of the engine-connected part, dog-engaging springs acting to move the dogs to the engaging position in relation to the engine-connected part, a dog-releasing device movable longitudinally and connected with the energy-storing device to be moved longitudinally thereby in one direction to move the actuating arms of the dogs and thereby disengage the dogs from the engine-connected part upon the completion of the energy-storing operation and to be moved longitudinally in the other direction to permit the dog-engaging springs to return the dogs to engaging position upon the use of the energy-storing device in an engine-starting operation, and clearance-providing springs combined with the releasing device to impart to the dogs a further clearance-providing movement after the dogs have been disengaged from the engine-connected part.

In testimony whereof I have affixed my signature in presence of two witnesses.

CLYDE J. COLEMAN.

Witnesses:
 HARRY C. LEWIS,
 BERNARD COWAN.